US012585278B2

(12) United States Patent
Rasam et al.

(10) Patent No.: US 12,585,278 B2
(45) Date of Patent: Mar. 24, 2026

(54) ROBOT NAVIGATION

(71) Applicant: ObjectVideo Labs, LLC, Tysons, VA (US)

(72) Inventors: Aditya Shiwaji Rasam, McLean, VA (US); Timon Meyer, Centreville, VA (US); Narayanan Ramanathan, Chantilly, VA (US); Donald Gerard Madden, Columbia, MD (US); Glenn Tournier, Vienna, VA (US); Suyash Yeotikar, McLean, VA (US); Scott Almes, Laurel, MD (US)

(73) Assignee: ObjectVideo Labs, LLC, Tysons, VA (US)

( * ) Notice: Subject to any disclaimer, the term of this patent is extended or adjusted under 35 U.S.C. 154(b) by 173 days.

(21) Appl. No.: 18/225,891

(22) Filed: Jul. 25, 2023

(65) Prior Publication Data

US 2024/0036582 A1 Feb. 1, 2024

Related U.S. Application Data

(60) Provisional application No. 63/392,389, filed on Jul. 26, 2022.

(51) Int. Cl.
G05D 1/00 (2024.01)
(52) U.S. Cl.
CPC .................................. G05D 1/0246 (2013.01)
(58) Field of Classification Search
CPC .................. G05D 1/0246; G05D 1/467; G05D 2109/254; G05D 2111/10; G05D 1/243; G05D 1/0214; G05D 1/628; G05D 1/646; G06T 7/68; G06T 7/73; G06T 7/77;

G06T 2207/10016; G06T 2207/10024; G06T 2207/10028; G06T 2207/10048; G06T 2207/20081; G06T 2207/20084; G06T 7/536; G06T 2207/30172; G06T 7/12; G06T 7/13; G06V 10/44; G06V 20/17; G06V 30/1801; B25J 5/007; B25J 9/162; B25J 9/163; B25J 9/1664; B25J 9/1666; B25J 9/1684; B25J 11/0085; B25J 13/086;

(Continued)

(56) References Cited

U.S. PATENT DOCUMENTS 9,978,149 B1 * 5/2018 Zhang ........................ G06T 7/73
11,410,330 B2 * 8/2022 Skidmore ................. G06T 7/80

(Continued)

OTHER PUBLICATIONS

Shieh et al "Two-Stage Fuzzy Navigation Control of a Vision-Based Intelligent Shopping Service Robot", 2004, The 30th Annual Conference of the EEE Industrial Electronics Society, pp. 430-435 (Year: 2004).*

(Continued)

*Primary Examiner* — Esvinder Singh
(74) *Attorney, Agent, or Firm* — Fish & Richardson P.C.

(57) ABSTRACT

Methods, systems, and apparatus, including computer programs encoded on computer storage media, for robot navigation. One of the methods includes obtaining one or more images of an area from a robot; detecting two or more lines within the one or more images; identifying at least two of the two or more lines as vanishing lines; determining, using the vanishing lines, a correction maneuver; and controlling the robot to implement the correction maneuver.

20 Claims, 3 Drawing Sheets

(58) Field of Classification Search
CPC ... B25J 13/089; B25J 19/021; A47L 2201/00;
A47L 2201/04
See application file for complete search history.

(56) References Cited

U.S. PATENT DOCUMENTS

| | | | | |
|---|---|---|---|---|
| 2020/0282566 A1* | 9/2020 | Yi | ............................ | B25J 9/161 |
| 2021/0072770 A1* | 3/2021 | Kwon | .................... | G05D 1/042 |
| 2021/0261392 A1* | 8/2021 | Theos | .................... | G05D 1/224 |
| 2022/0270358 A1* | 8/2022 | Cox | .................... | G06V 10/811 |
| 2023/0139606 A1* | 5/2023 | Kim | ........................ | G06T 7/246 |
| | | | | 701/3 |

OTHER PUBLICATIONS

Garcia et al "Autonomous Indoor Navigation of a Stock Quadcopter
with OffBoard Control", Oct. 3-5, 2017, 2017 Workshop on Research,
Education and Development of Unmanned Aerial Systems (RED-
UAS) (Year: 2017).*

* cited by examiner

ROBOT NAVIGATION

CROSS-REFERENCE TO RELATED APPLICATION

This application claims the benefit of U.S. Provisional Application No. 63/392,389, filed Jul. 26, 2022, the contents of which are incorporated by reference herein.

BACKGROUND

A monitoring system for a property can include various components including sensors, e.g., cameras, and other devices. For example, the monitoring system may use the camera to capture images of people or objects of the property.

SUMMARY

This specification describes techniques, methods, systems, and other mechanisms for navigating a robot in a hallway. A hallway can present various difficulties in navigation including lack of features, such as visual features, or structural complexity. Moreover, the tight physical constraints of a hallway may need tight tolerance of navigation which, given typical measurement drift in location tracking, such as visual inertial odometry (VIO), may not be available. If a robot navigates into a hallway when navigation elements determine incorrect values due to measurement drift, the robot is likely to cause damage both to itself and the property.

As described herein, by detecting features, e.g., vanishing lines, vanishing points, among others, of a hallway scene, a processing device of a robot can determine a heading of a robot and whether or not the robot is centered. Based on determining if the robot is correctly oriented and centered in the hallway, the processing device can ensure that the robot navigates through the hallway, or other confined space, without damage to property, its own components, or both, and can complete its mission. Features of a hallway can be found in other space regions and methods for navigation in the former can be used in the latter.

Robots can include drones. Robots can use vision (camera feed), time-of-flight (TOF), Light Detection and Ranging (LIDAR), sonar, other data streams, or a combination of these, that come from built-in sensors to estimate a pose.

In general, one innovative aspect of the subject matter described in this specification can be embodied in methods that include the actions of obtaining one or more images of an area from a robot; detecting two or more lines within the one or more images; identifying at least two of the two or more lines as vanishing lines; determining, using the vanishing lines, a correction maneuver; and controlling the robot to implement the correction maneuver.

Other implementations of this aspect include corresponding computer systems, apparatus, computer program products, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination. In some implementations, controlling the robot to implement the correction maneuver includes: providing the correction maneuver to the robot. In some implementations, determining, using the vanishing lines, the correction maneuver includes: determining, using the vanishing lines, a centeredness of the robot, wherein the centeredness indicates a location of the robot with reference to the area; and determining, using the centeredness of the robot, the correction maneuver. In some implementations, determining, using the vanishing lines, the centeredness of the robot includes: determining (i) a first slope of a first vanishing line of the at least two vanishing lines and (ii) a second slope of a second vanishing line of the at least two vanishing lines; comparing the first slope and the second slope; and determining, using the comparison of the first slope and the second slope, the centeredness of the robot.

In some implementations, the area is a hallway. In some implementations, determining, using the vanishing lines, the correction maneuver includes: determining, using the vanishing lines, a heading of the robot; and determining, using the heading of the robot, the correction maneuver. In some implementations, determining, using the vanishing lines, the heading of the robot includes: determining an intersection of the at least two vanishing lines; and determining, using the intersection of the at least two vanishing lines, the heading of the robot. In some implementations, determining the intersection of the at least two vanishing lines includes: extending portions of the at least two vanishing lines that are visible in the one or more images, wherein extended portions include the intersection of the at least two vanishing lines. In some implementations, determining, using the intersection of the at least two vanishing lines, the heading of the robot includes: comparing a location of the intersection with a location of a middle of an image of the one or more images. In some implementations, the actions include: obtaining a width of the image of the one or more images; and determining, using the width of the image, the middle of the image of the one or more images.

In some implementations, the robot is an aerial drone. In some implementations, the actions comprise: determining, using obtained sensor data, that the robot is in a space enclosed by walls; and in response to determining that the robot is in the space enclosed by walls, performing one or more operations including determining, using the vanishing lines, the correction maneuver. In some implementations, the obtained sensor data includes the one or more images of the area from the robot. In some implementations, the obtained sensor data includes data obtained from a proximity sensor, and wherein determining, using the obtained sensor data, that the robot is in the space enclosed by walls includes: comparing the obtained sensor data to one or more thresholds.

In some implementations, the actions include: determining, using obtained sensor data, that the robot moved out of the area; and in response to determining that the robot is out of the area, performing one or more navigation processes. In some implementations, the one or more navigation processes include visual inertial odometry (VIO).

The subject matter described in this specification can be implemented in various implementations and may result in one or more of the following advantages. For example, using vanishing lines to assist in navigation can reduce computational requirements and increase computation efficiency of navigation compared to, e.g., neural network generators among others. In some implementations, one or more neural networks are used to assist in navigation described in this document.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
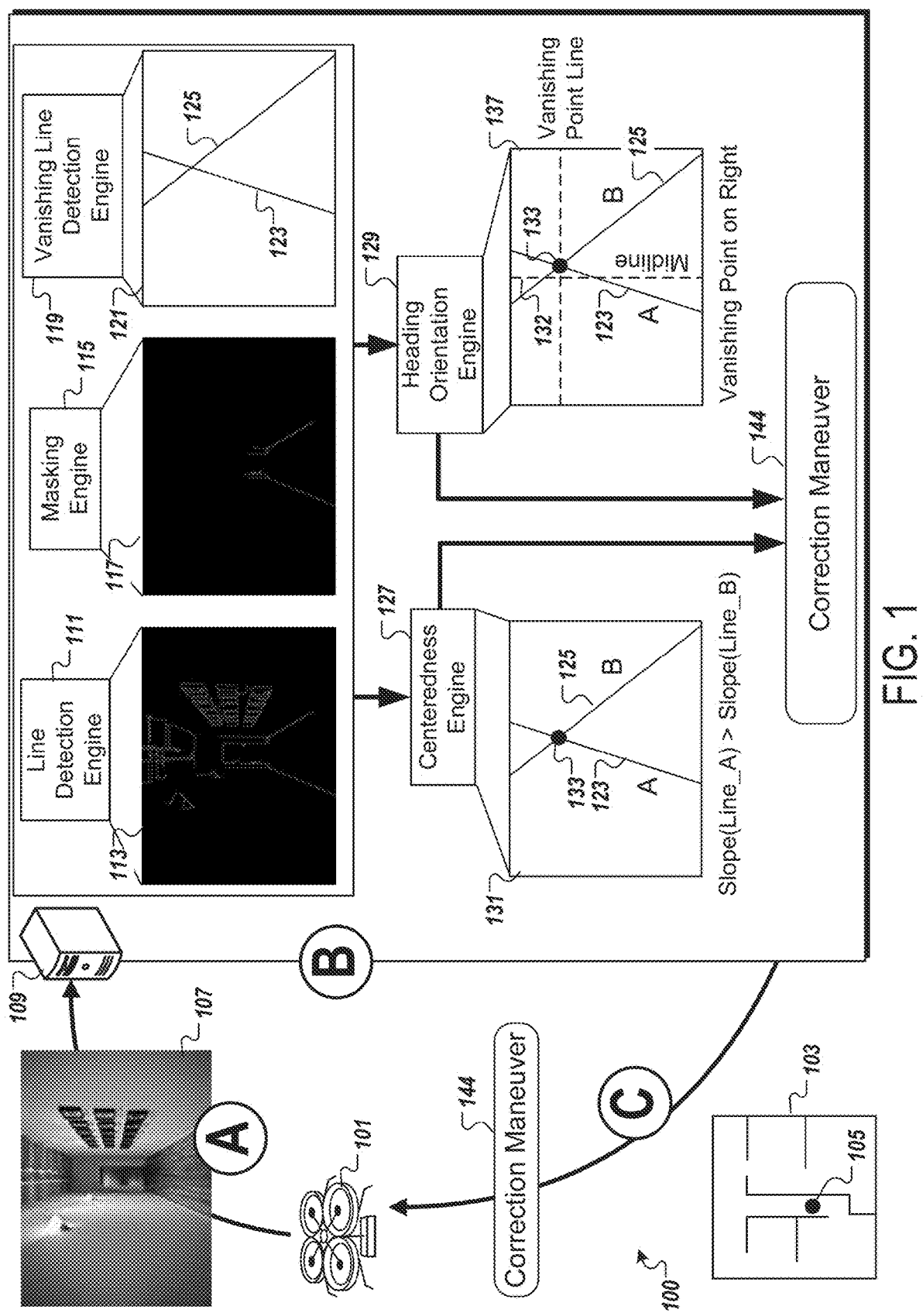
FIG. 1 is a diagram showing an example of a system for robot hallway navigation.

FIG. 1 is a diagram showing an example of a system 100 for robot hallway navigation. The system 100 includes a robot 101. In some implementations, the robot 101 is a drone. The system 100 includes a controller 109 that processes data from the robot 101. In some implementations, the controller 109 includes one or more computers onboard the robot 101. For example, the controller 109 can include one or more processors of the robot 101. The processors can control operations of the robot 101. In some implementations, the controller 109 can include or be part of one or more computers communicably connected to one or more computing devices onboard the robot 101. For example, the controller 109 can include a server with one or more processors configured to execute instructions for operations shown in FIG. 1.

In the example of FIG. 1, the robot 101 is within a hallway as shown in map 103 showing a property layout. The robot 101 is at location 105. In some implementations, the processes shown in FIG. 1 are used in addition to, or instead of, generic navigation processes (e.g., GPS or local positioning system, VIO, among others). For example, if the controller 109 determines that, based on one or more sensors (e.g., GPS, VIO, LIDAR, proximity, visual/camera), the robot 101 is in a hallway or other confined space with defined walls, the controller 109 can perform the operations described with reference to FIG. 1. In some implementations, the controller 109 determines that one or more generic navigation processes are not suitable for a present or future location of the robot 101. For example, the controller 109 can determine that the robot 101 is in a hallway or other confined space with defined walls and determine, in response to sensor data indicating the hallway or other confined space with defined walls, that techniques described in reference to FIG. 1 are to be used for navigation instead of, or in addition to, other navigation processes.

In some implementations, after the operations described with reference to FIG. 1 successfully aid in navigating a robot, such as the robot 101, out of a confined space, other navigations processes (e.g., VIO, GPS, among others) can be used for navigation.

In some implementations, the controller 109 determines that the robot 101 is in a hallway or other confined space. For example, the controller 109 can obtain sensor data (e.g., the image 107) from the robot 101 or another connected device in a monitoring system. The controller 109 can process the sensor data to determine whether or not the robot 101 is in a hallway or other confined space. In some implementations, the controller 109 includes one or more neural networks. The neural networks can be trained, using one or more sensor data values corresponding to known confined space or hallway locations, to determine when the robot 101 is in a hallway or confined space. In some implementations, the controller 109 includes one or more processors executing one or more algorithms. For example, an algorithm can process one or more sensor data items and compare the sensor data items, or values generated from the sensor data items, to one or more thresholds (e.g., comparing distance data—from depth sensors, SONAR, image processing, among others—obtained from on one or more sides of the robot 101 to distance thresholds—such as 3 feet). Based on the comparison, e.g., when one or more thresholds are satisfied, the controller 109 can determine whether or not the robot 101 is in a hallway or other confined space. In some implementations, after the controller 109 determines the robot 101 is in a hallway or confined space, the controller 109 performs one or more operations described with reference to FIG. 1.

FIG. 1 is described with reference to stages A through C. Processes can be performed by one or more computers in the order indicated by stages A through C as well as other orders. In stage A, the robot 101 obtains an image 107, e.g., using a camera onboard the robot 101, and provides the image 107 to the controller 109. In stage B, the controller 109 processes the image 107 to generate a correction maneuver 144. In stage C, the controller 109 provides the correction maneuver 144 to the robot 101 to correct a position or orientation of the robot 101.

More specifically, as described in FIG. 1, in stage A, one or more sensors of the robot 101 capture the image 107. For example, the robot 101 can include a camera. A camera of the robot 101 can be configured to generate images in red, green, blue (RGB), infrared (IR), depth, among others. In some implementations, the robot 101 generates point cloud data. For example, the robot 101 can generate point cloud data that represents lines and edges. The controller 109 can determine one or more lines or edges from the point cloud data. In some implementations, the controller 109 generates an image that only shows lines. For example, the controller 109 can generate a two dimensional image that indicates a vanishing lines using the point cloud data or images generated by the robot 101.

In general, any data suitable for later processing of edge detection can be captured by one or more sensors of the robot 101. In some implementations, the robot 101 includes additional sensors that can capture other data. The sensors of the robot 101 capture the image 107 and provide the image 107 to the controller 109.

In stage B, the controller 109 obtains the image 107, and optionally other sensor data. In some implementations, the controller 109 obtains one or more images from the robot 101. For example, the controller 109 can obtain multiple images from the robot 101. The controller 109 can select, from a number of images obtained from the robot 101, a quality image. The controller 109 can determine an image that satisfies one or more thresholds as a quality image. In some implementations, the controller 109 ranks one or more obtained images to determine a quality image as an image that is within a top N images after ranking. Images can be ranked according to detected features within the images. For example, the controller 109 can determine a likelihood of visible vanishing lines within an image. The controller 109 can determine a clarity of lines within images using a quality score or other value indicating clarity of a line (e.g., 0 to 100 indicating an amount of blur in images). The controller 109 can rank multiple images using detected features and corresponding likelihood values, quality scores, or both.

The controller 109 operates one or more modules that process the image 107. The one or more modules include a line detection engine 111, a masking engine 115, a vanishing line detection engine 119, a centeredness engine 127, and a heading orientation engine 129. The line detection engine 111, the masking engine 115, and the vanishing line detection engine 119 can extract vanishing lines 123 and 125 from the image 107. The centeredness engine 127 and the heading orientation engine 129 can determine the correction maneuver 144 using the vanishing lines 123 and 125.

The line detection engine 111 detects lines within the image 107. In some implementations, the line detection engine 111 includes one or more visual detection algorithms. For example, the visual detection algorithms can process one or more pixels of the image 107. The algorithms can determine changes in pixel values corresponding to edges of elements represented within the image 107. In some implementations, the line detection engine 111 includes one or more trained neural networks. For example, one or more neural networks of the line detection engine 111 can be trained to detect lines within images. Training data including images with labeled lines can be provided to a neural network of the one or more neural networks. Output of the neural network can be compared with the labeled training data. Based on a difference between the neural network output and the labeled training data, the line detection engine 111, or an operating device, can adjust one or more connections or weights of the neural network to reduce a difference value between the output and the labeled training data.

The line detection engine 111 provides detected line data to the masking engine 115. The masking engine 115 obtains the detected line data and masks lines that do not correspond to vanishing lines. In some implementations, the masking engine 115 includes one or more neural networks. For example, the masking engine 115 can include a network trained to detect vanishing lines. Vanishing lines may generally point towards one another, may generally point toward the same focal point, e.g., on the horizon, may be located near a bottom or top portion of an image when tilt and other angles, e.g., of a view from a robot, are 0, or a combination of these. A neural network of the masking engine 115 can be trained using training data of vanishing lines in images. Training images with labeled vanishing lines can be input to a network of the masking engine 115. Output of the network, predicting locations of the vanishing lines or masking which retains vanishing lines while masking portions of the image that are not vanishing lines, can be compared with the labeled data. An update engine can determine if the vanishing lines were correctly identified and adjustments to weights or layers of the network of the masking engine 115 to improve vanishing line detection.

In some implementations, the controller 109 uses images or other data captured before the image 107 to generate vanishing line estimates. The controller 109 can employ techniques, such as filtering, aggregating, predicting, or a combination of these, to generate vanishing line estimates. For example, the controller 109 can use a Kalman filter to improve line estimates using previously obtained data or estimates of how a robot, such as the robot 101, has moved or a model of a robot's possible movements. Estimates of how a robot has moved can be obtained from VIO or raw inertial data.

In some implementations, masking lines that do not correspond to vanishing lines include processing lines detected from one or more structures. For example, the line detection engine 111 can detect lines from paintings on a wall of a hallway, tables, among others. The masking engine 115 can process these detected lines to determine which lines likely correspond to vanishing lines or lines that are within a threshold of symmetry on either side of a hallway.

In some implementations, the masking engine 115 masks lines that do not satisfy one or more vanishing line thresholds. For example, the masking engine 115 can mask lines that do not satisfy an angle threshold. The line detection engine 111 can provide line data for lines not oriented within a threshold orientation range along a given hallway. In some examples, the masking engine 115 can compare lines of paintings hanging on a wall of the hallway with an angle threshold to determine whether to mask the lines. For instance, when an angle is around 90, the masking engine 115 can determine that the angle does not satisfy the angle threshold, is likely substantially vertical, and should be masked. In some implementations, angles are measured from a horizontal image axis (e.g., horizontal from viewpoint of a camera or sensor of the robot 101, horizontal relative to a ground surface detected by the robot 101, among others).

In some implementations, the masking engine 115 determines symmetry of detected lines. For example, the masking engine 115 can determine a line of symmetry (e.g., along a center of a hallway, along a center of a field of view captured by the robot 101, among others). The masking engine 115 can select lines of symmetry for further processing, e.g., to determine a vanishing point or a step prior to such a determination, while determining to not use lines that do not have a corresponding symmetrical line for further processing.

The masking engine 115 can determine lines of symmetry by determining if two lines satisfy a threshold of symmetry, e.g., if a line on one side of a line of symmetry has a slope that is equal and opposite or equal, within a threshold amount, from a line detected on another side of the line of symmetry. Pairs of lines that are symmetrical can be obtained by the masking engine 115 and provided to the vanishing line detection engine 119. In some implementations, detected lines that satisfy a symmetry threshold include lines representing a meeting point between a wall and a floor. In some implementations, detected lines that satisfy a symmetry threshold include lines representing a meeting point between a wall and a ceiling. In some implementations, detected lines that satisfy a symmetry threshold include lines representing a baseboard.

In some implementations, the masking engine 115 selects one or more detected lines from a group of detected lines. For example, the masking engine 115 can select one or more lines using a distance of the respective line from a horizon. In some cases, the masking engine 115 can determine a horizon as a top or bottom of an image. In some implementations, detecting lines further from a horizon as vanishing lines improves centering and heading orientation for a robot 101. For example, slopes of lines further from a horizon can have greater slopes (e.g., as measured in pixels) than lines closer to a horizon. The greater slope can help with relative slope comparisons, e.g., performed by the centeredness engine 127. In general, a change in slope for two lines further from a horizon will be greater than a change in slope for two lines closer to a horizon. In some cases, selecting one or more lines helps improve robustness, e.g., when image or edge detection is noisy. In general, greater changes in lines further from a horizon can require less accuracy or precision in line detection while retaining accuracy in operations performed to generate the correction maneuver 144.

In some implementations, selecting one or more detected lines includes weighting one or more lines. For example, the masking engine 115 can apply weights to one or more lines with one or more values. In some implementations, weighting values are determined using a distance between the line and a horizon. For example, the masking engine 115 can apply smaller weights to lines closer to a horizon than lines further away from a horizon. The masking engine 115 can use one or more thresholds and the weights to determine, based on whether or not a weight determined by the masking engine 115 for a given line satisfies one or more thresholds, whether to mask out one or more lines or select them and provide data representing the selected lines to the vanishing line detection engine 119. For instance, the masking engine 115 can mask lines with lower weights while selecting lines with higher weights, e.g., that latter of which satisfy the one or more thresholds while the former do not satisfy the one or more thresholds. In some implementations, the masking engine 115 applies a standard mask, e.g., a lower triangle mask, trapezoid mask, or an upper triangle, among others, to data from the line detection engine 111 representing one or more detected lines.

In some implementations, the masking engine 115 uses a static filter. For example, the masking engine 115 can retain a bottom portion (e.g., bottom portion of image 117) of the line detected image (e.g., image 113). The bottom portion can vary depending on implementation. The bottom portion can be rectangular, circular, or any other shape. In some implementations, a mask retaining a bottom circular portion of the image 113 effectively retains vanishing lines. For example, because of a typical positioning of a robot, vanishing lines for a given use case may generally appear in certain locations. The masking engine 115 can apply a mask to retain only those certain locations, e.g., regions of image data. In this way, computational efficiency can be increased by not processing portions that do not likely include vanishing lines.

The vanishing line detection engine 119 obtains data from the masking engine 115. As shown in image 121, the vanishing line detection engine 119 detects vanishing lines 123 and 125 using the masked portion 117 of image 113. After the masking engine 115 applies a mask, the vanishing line detection engine 119 can detect lines without the complications of additional line elements or the vanishing line detection engine 119 can use multiple line elements to determine vanishing lines. This can improve vanishing line detection. The vanishing line detection engine 119 can include one or more neural networks trained to detect vanishing lines. Labeled images with vanishing lines can be processed by a neural network in training. Output of the neural network in training can be compared with training data to determine a difference value. The neural network can be adjusted, e.g., by the controller 109, to improve the detection accuracy of the vanishing line detection engine 119.

In some implementations, the vanishing line detection engine 119 obtains data indicating one or more line detections from the masking engine 115. The data can be an image, e.g., image portion 117. The vanishing line detection engine 119 can process one or more detected lines. The vanishing line detection engine 119 can generate a vanishing line as a combination of one or more line elements. For example, a line representing a meeting between a baseboard and a wall and a line representing a meeting between the baseboard and a floor can be combined to generate a single vanishing line. In some implementations, the vanishing line detection engine 119 averages data of the lines, e.g., a slope of each line, to generate values representing a vanishing line.

In some implementations, the vanishing line detection engine 119 selects two lines. For example, the vanishing line detection engine 119 can select two lines detected by the line detection engine 111 and provided by the masking engine 115. One of the two lines can be generated from multiple lines, e.g., lines parallel, or satisfying a parallel threshold, with respect to each other). In some implementations, all lines that have a positive slope are combined. In some implementations, all lines that have a negative slope are combined. For example, multiple lines with a negative slope (assuming XY coordinate plane with origin in lower left of image 121) can be combined to generate the vanishing line 125.

In some implementations, generating a vanishing line includes calculating an average slope of all the lines with positive slopes. For example, the vanishing line detection engine 119 can combine one or more lines provided by the masking engine 115 to generate the vanishing line 123. In some implementations, the vanishing line detection engine 119 includes a module for processing one or more operations, e.g., random sample consensus (RANSAC), neural network, machine learning model training, among others.

In some implementations, a neural network detects vanishing lines using the image 107. For example, instead of applying one or more processes of line detection and masking, a neural network can process the image 107 obtained from the robot 101. In some implementations, the image 107 can be pre-processed before being processed by the neural network. The neural network can take the place of two or more of the line detection engine 111, the masking engine 115, or the vanishing line detection engine 119. The neural network can be trained using labeled images. The image labels can indicate locations of vanishing lines within images. The neural network can generate output indicating vanishing line predictions for training data. An update engine, e.g., operated by the controller 109, can compare the predictions to labeled, or ground truth, data. Based on a difference value, the update engine can adjust weights or layers of the neural network to improve the detection of vanishing lines.

The controller 109 determines the vanishing lines 123 and 125 using the image 107. As stated, the controller 109 can use either the line detection engine 111, the masking engine 115, the vanishing line detection engine 119, or use a sole neural network trained to detect vanishing lines. The controller 109 can provide data corresponding to the vanishing lines 123 and 125 to the centeredness engine 127 and the heading orientation engine 129.

In some implementations, one or more processes of the controller 109 are performed in parallel. For example, the controller 109 can process the centeredness engine 127 in parallel with the heading orientation engine 129. In some implementations, the controller 109 executes operations serially.

The centeredness engine 127 detects features of the vanishing lines 123 and 125 and, using the features, determines whether or not the robot 101 is centered within a hallway. In the example of FIG. 1, the centeredness engine 127 generates a slope for each of vanishing line 123 and 125. The centeredness engine 127 compares the slope of line 123 to the slope of line 125. Based on the comparison, the centeredness engine 127 determines whether or not the robot 101 is centered within the hallway In some implementations, the centeredness engine 127 determines a centeredness of the robot 101 using one or more calculated slopes. For example, if the slope or the absolute value of the slope of the line 123 is greater than the slope or the absolute value of the slope of line 125, the centeredness engine 127 can determine that the robot 101 is closer to the wall corresponding to the line 123 than the wall corresponding to the line 125. If the slope or the absolute value of the slope of the line 123 is less than the slope or the absolute value of the slope of line 125, the centeredness engine 127 can determine that the robot 101 is closer to the wall corresponding to the line 125 than the wall corresponding to the line 123. If the slope or the absolute value of the slope of the line 123 is equal to, or the difference satisfies a threshold between the slope or the absolute value of the slope of the line 123 and, the slope or the absolute value of the slope of line 125, the centeredness engine 127 can determine that the robot 101 is centered within a given hallway.

The centeredness engine 127 can generate one or more actions and include the one or more actions in the correction maneuver 144. For example, the centeredness engine 127 can determine, based on the detected vanishing lines 123 and 125, that the robot 101 is closer to the left hand wall (e.g., the wall corresponding to the line 123) than the right hand wall (e.g., the wall corresponding to the line 125). Based on a determination of centeredness (e.g., closer to one wall or substantially centered), the centeredness engine 127 can generate movement command as actions to be performed by the robot 101. The movement commands can include a request configured to, when sent to the robot 101, control movement functions of the robot 101 (e.g., propeller function, rudders, wheels, engines, battery, among others). In the example of FIG. 1, the movement commands can include a request for the robot 101 to move to the right (e.g., towards the wall corresponding to the edge defined by the line 125).

When the centeredness engine 127 determines, using the vanishing lines 123 and 125, that the robot 101 is substantially centered between two walls, the centeredness engine 127 can determine to skip generating an action for a correction maneuver 144. For instance, the centeredness engine 127 can determine that the slopes of the vanishing lines 123 and 125 indicate that the robot 101 is substantially centered, e.g., by satisfying a substantially centered threshold indicating a difference between slope measurements of the lines 123 and 125, between two walls and a course correction is not necessary given the slopes.

The heading orientation engine 129, similar to the centeredness engine 127, can generate one or more actions and include the one or more actions in the correction maneuver 144. For example, the centeredness engine 127 can determine, based on the detected vanishing lines 123 and 125, that a heading of the robot 101 is not pointed towards an end of the hallway in which the robot 101 is located. If not corrected, the robot 101 could run into the wall causing damage.

In some implementations, the heading orientation engine 129 can determine a vanishing point 133. For example, the heading orientation engine 129 can obtain output data indicating vanishing line 123 and 125. Using the data indicating the vanishing lines 123 and 125, the heading orientation engine 129 can determine the vanishing point 133. The vanishing point 133 is the point at which the vanishing lines 123 and 125 intersect. In implementations in which the detecting vanishing lines 123 and 125 do not intersect in an image, the vanishing point 133 is the point at which the vanishing lines 123 and 125 would intersect if the vanishing lines 123 and 125 were extended toward each other.

In some implementations, only one component in the controller 109 needs to determine the vanishing lines 123 and 125. For instance, either the centeredness engine 127, the heading orientation engine 129, or another component in the controller 109, can determine the vanishing lines 123 and 125. That component can provide data for the determined vanishing lines 123 and 125 to any other components in the controller 109.

In some implementations, the controller 109 determines a vanishing point. For example, the controller 109 can operate a module running an edge detection algorithm to detect an edge, e.g., along a hallway. The controller 109 can detect a vanishing point as a meeting of two lines using one or more detected lines.

The heading orientation engine 129 can generate data for the correction maneuver with a vanishing point. The heading orientation engine 129 can, in some cases, generate this data without determining slopes of vanishing lines or with only a vanishing point provided by the controller 109. In some implementations, the controller 109 applies one or more thresholds to detected lines. For example, the controller 109 can apply an angle threshold to remove one or more detected lines with slopes with a threshold value of vertical (e.g., 90 degrees with respect to a horizontal line). Examples of real world vertical lines can include sides of a painting hung on a wall of a hallway.

The heading orientation engine 129 determines an orientation of the robot 101 using the vanishing point 133. For example, as shown in FIG. 1, the heading orientation engine 129 determines a location of the vanishing point 133 relative to a midline 132. The heading orientation engine 129 can determine the midline 132 using an algorithm to bisect the image 137, based on the image 107. The algorithm can determine a width of the image 137 and determine an x coordinate, e.g., in an x/y coordinate system for representing the image 137, of the midline 132 as the width of the image 137 divided by two. The midline 132 can indicate a separation of two equal halves of the image 137.

To determine an orientation of the robot 101 using the vanishing point 133, the heading orientation engine 129 compares the vanishing point 133 location to the midline 132. In the example of FIG. 1, this comparison includes comparing the x coordinate of the midline 132 with the x coordinate of the vanishing point 133, e.g., in an x/y coordinate system. It is appreciated that other coordinate systems and methods for determining location and size can be used, e.g., in a three-dimensional coordinate system using two coordinates. In general, if the vanishing point 133 is not aligned with the midline 132, then the robot 101 is not oriented towards the end of the hallway represented by the lines 123 and 125. That is, if the vanishing point 133 is to the right of the midline 132, the heading orientation engine 129 can determine actions to re-orient the robot 101 to the right, e.g., configured to activate various mechanical elements of the robot 101. Similarly, if the heading orientation engine 129 determines that the vanishing point 133 is to the left of the midline 132, the heading orientation engine 129 can determine actions to re-orient the robot 101 to the left. Re-orientation can include adjusting yaw, pitch, or roll, of the robot 101.

In some implementations, the heading orientation engine 129 compares a difference between a location of the vanishing point 133 and a location of the midline 132 with a threshold to determine actions to re-orient the robot 101. For example, if the vanishing point 133 is within a region that includes the midline 132 (e.g., centered about the midline 132 extending for a system specified distance or variable distance from the midline 132), the heading orientation engine 129 can generate no reorientation adjustments. In this case, the robot 101 is substantially orientated with the hallway. A threshold distance can be used to designate when to start reorientation or gradually introduce reorientation. For example, the heading orientation engine 129 can increase a magnitude of actions for reorientation as it determines the vanishing point 133 is further away from the midline 132. When the vanishing point 133 is within a threshold distance from the midline 132, the heading orientation engine 129 might not provide reorientation actions or can provide actions of less magnitude (e.g., yaw correction that decreases the distance between the midline 132 and the vanishing point 133 by half instead of decreasing it to 0) than when the vanishing point 133 is beyond a threshold distance from the midline 132.

In some implementations, with known field of view (FOV) parameters, the controller 109 determines the correction maneuver 144. For example, the robot 101 can provide details of a FOV to the controller 109. The controller 109 can obtain information on a FOV for a camera on the robot 101. Using data indicating sensor data captured by the robot 101, the controller 109 can determine adjustments to roll, pitch, or yaw. In some cases, the controller 109 can determine the robot 101 is centered in a hallway (e.g., using data from the centeredness engine 127). The controller 109 can generate a yaw offset or adjustment value for correction from a heading (e.g., determined by the heading orientation engine 129). To consider one example, an image width processed by the controller 109 can be 320 pixels. A FOV for a camera on the robot 101 capturing the image can be 80 degrees. Every pixel separating the vanishing point 133 from the midline 132 can be off by 0.25 degrees per pixel. Vanishing point X coordinate, where X is along the width and origin is top left, can be 80 pixels and the center line can be at 160 pixels. In this case, the heading can be off by −80 pixels from the vanishing point 133 and hence −80*0.25=−20 degrees. Then the correction maneuver 144 can include an instruction or data indicating an offset of 20 degrees for yaw. Similar operations can be performed when the robot 101 is not centered.

The heading orientation engine 129 can determine actions to re-orient the robot 101 in the correction maneuver 144. The controller 109 can provide the correction maneuver 144 to the robot 101. The correction maneuver 144 is configured to activate one or more elements of the robot 101 to adjust a centeredness or an orientation of the robot 101.

In some implementations, the controller 109 obtains multiple images from the robot 101. The controller 109 can generate a correction maneuver, similar to the correction maneuver 144, for one or more of the images obtained from the robot 101.

In some implementations, the controller 109 detects one or more vanishing lines. For example, as shown in FIG. 1, the vanishing lines 123 and 125 define the walkway of a hallway. In some implementations, the controller 109 detects other vanishing lines of a space. For example, the vanishing line detection engine 119 can detect lines from a ceiling. In some cases, this may provide more accurate detection if there are obstacles that obscure other vanishing lines. The controller 109 can determine if one or more objects are obscuring one or more vanishing lines. Based on determining if one or more objects are obscuring one or more vanishing lines, the controller 109 can determine one or more additional vanishing lines, e.g., vanishing lines from a wall meeting a ceiling or wall meeting a floor.

In some implementations, the controller 109 can detect lines that are partially occluded. For example, the controller 109 can detect a first portion of a line and a second portion of a line where the first and second portions are separated by an occlusion. The controller 109 can generate a second line based on determining that the first portion and the second portion are parallel or other output from one or more algorithms.

In some implementations, one or more vanishing lines are used to determine altitude. For example, the controller 109 can determine, using a slope of a vanishing line, how close the robot 101 is to a planar surface (e.g., a floor of a hallway) that includes the vanishing line (e.g., lies within a mathematical plane formed by the floor of the hallway). If the slope is small, relative to a horizontal line, the robot 101 is closer to a plane of the line than if the slope is larger. The controller 109 could include one or more algorithms or one or more neural networks to determine altitude. In some implementations, the controller 109 includes altitude adjustments in the correction maneuver 144.

In some implementations, when the controller 109 does not generate altitude adjustments, the robot 101 proceeds at a current altitude or changes altitude according to a current, or adjusted, set of flight parameters. For example, flight of the robot 101, when the robot 101 is configured with flight capabilities, can be described with the parameters pitch, roll, and yaw. Adjustments to pitch, roll, and yaw provided by the correction maneuver 144 may, or may not, affect altitude. For example, a negative or positive pitch can affect altitude. If, as described herein, the controller 109 determines that a slope is small and satisfies a threshold for altitude adjustments, pitch, among other parameters, can be adjusted and included in the correction maneuver 144. If the controller 109 does not include adjustments that affect altitude, the robot 101 can proceed with altitude changes as it would without having received the correction maneuver 144.

In some implementations, the correction maneuver 144 generation is part of a navigation process. For example, the controller 109 can obtain data from the robot 101, such as image data, LIDAR data, among others. The controller 109 can operate normal navigation processes, such as VIO, Simultaneous Localization and Mapping (SLAM), among others, to aid the robot 101 maneuver at a property and generate a correction maneuver, such as the correction maneuver 144, when applicable.

In some implementations, the controller 109 determines the robot 101 is in a confined space using data obtained from the robot 101. In some implementations, the controller 109 runs line detection algorithms, such as algorithms or models of the line detection engine 111, on all images obtained to determine when line detection and subsequent correction maneuver generation can be performed, e.g., when the robot 101 is in a confined space such as a hallway. In some implementations, the controller 109 obtains a location of the robot 101 (e.g., GPS or local positioning system) and compares the location with known locations of confined spaces or spaces with known vanishing lines. In some implementations, the controller 109 determines a distance between detected vanishing lines. If the distance satisfies a threshold, the controller 109 can proceed as described with reference to FIG. 1. If not, the controller 109 can operate one or more normal navigation algorithms, such as VIO or SLAM, among others.

In some implementations, the process of determining centeredness and heading using detected vanishing lines is used along only planar, or near planar (e.g., within a threshold deviation from perfectly planar) surfaces. For example, the process described with reference to FIG. 1 can be used in hallways, corridors, or the like, but not in stairwells.

In some implementations, the process of determining centeredness and heading using detected vanishing lines is used along non-planar surfaces. For example, in a stairwell vanishing lines such as molding along the steps of the stairs can be detected as vanishing lines and used to generate a correction maneuver 144.

In some implementations, the controller 109 determines that the surface is not planar or the surface is changing altitude. For example, the controller 109 can determine a slope of a stairwell and compensate altitude corrections using the slope of the stairwell. Based only on the slopes of vanishing lines defining a path of a stairwell, processes of the controller 109 can determine that the robot 101 is close to the ground and should increase altitude. However, by determining the robot 101 is in a stairwell and thus the slopes of the vanishing lines should be less than a corresponding planar, horizontal, hallway, for the same amount of altitude. The controller 109 can correct for altitude in proportion to a calculated slope of the stairwell.

In some implementations, a railing of a stairwell is detected as a vanishing line. The controller 109 can detect what the line detections correspond to using one or more visual recognition algorithms or known mapped features at a property. If a railing and an edge along a floor or molding are detected as vanishing lines, the controller 109 can determine a height difference between the elements. The controller 109 can adjust comparison calculations of slopes using the difference in height. For example, to determine centeredness, a first slope of a higher element extending into the distance is equal to a second slope of a lower element if the first slope is less than the second slope. Absolute values of slopes can be used to account for the change in sign between substantially vertically symmetrical vanishing lines.

In some implementations, if no vanishing lines are detected, the controller 109 performs normal navigation processes. For example, the controller 109 can perform VIO or SLAM processes. VIO or SLAM processes can aid the robot 101 in navigating within an environment.

Figure 2:
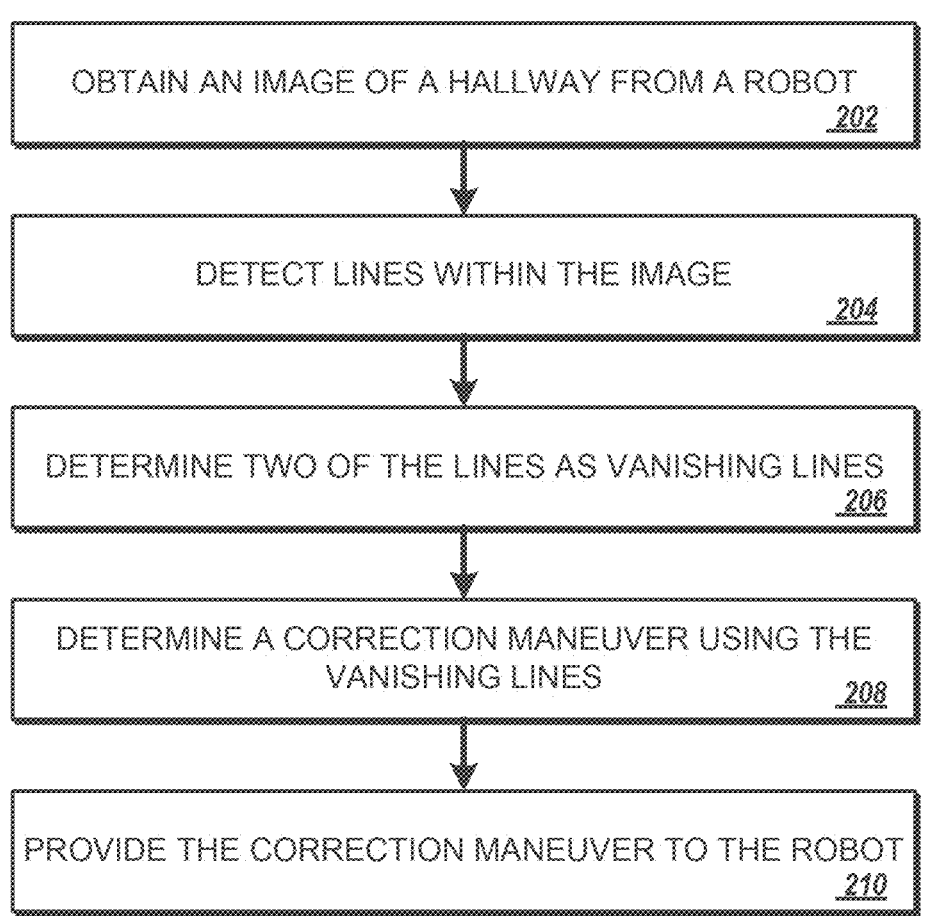
FIG. 2 is a flow diagram illustrating an example of a process for robot hallway navigation.

FIG. 2 is a flow diagram illustrating an example of a process for robot navigation. The process 200 can be performed by a computer, such as the controller 109.

The process 200 obtaining an image of a hallway from a robot (202). For example, the controller 109 can obtain the image 107 from the robot 101. In some implementations, the controller 109 is located remotely in reference to the robot 101. For example, the controller 109 can include one or more computers in a central server located at a location different from a location of the robot 101. In some implementations, the controller 109 is included in one or more computers onboard the robot 101. For example, the robot 101 can move around and use one or more onboard computers that perform operations corresponding to the controller 109.

The process 200 includes detecting lines within the image (204). For example, the line detection engine 111 of the controller 109 can detect one or more lines within the image 107.

The process 200 includes determining two of the lines as vanishing lines (206). For example, the controller 109 can determine one or more vanishing lines. The masking engine 115 and the vanishing line detection engine 119 can perform one or more operations that generate one or more vanishing lines using one or more lines detected by the line detection engine 111. In some implementations, the vanishing lines are on opposite sides of a hallway. For example, the controller 109 can determine a location of a hallway and determine lines with opposite slopes that are on opposite sides of the hallway as vanishing lines, e.g., symmetrical vanishing lines. The controller 109 can generate vanishing lines using a combination of one or more detected lines.

The process 200 includes determining a correction maneuver using the vanishing lines (208). The centeredness engine 127 and the heading orientation engine 129 of the controller 109 use data generated by the controller 109 (e.g., the line detection engine 111, the masking engine 115, or the vanishing line detection engine 119) to generate the correction maneuver 144.

The process 200 includes providing the correction maneuver to the robot (210). For example, the controller 109 can provide the correction maneuver 144 to the robot 101 as shown in stage C of FIG. 1. In some implementations, the controller 109 provides instructions to one or more elements configured to control movement of the robot 101. For example, the controller 109 can provide instructions to a propeller, rudder, air jet, among other elements used for locomotion by the robot 101. The instructions can indicate the correction maneuver 144 and, when executed by the elements of the robot 101, can correct a position of the robot 101. In some implementations, providing the correction maneuver to the robot is part of controlling the robot to implement the correction maneuver. For example, the controller 109 can be onboard the robot 101 and send signals to elements that control locomotion of the robot 101 as a part of controlling the robot 101. The controller 109 can be external—e.g., not onboard the robot 101—and send signals to a receiving device on the robot 101. The receiving device can be configured to control one or more elements of the robot 101 used for locomotion.

In some implementations, the controller 109 performs steps shown in FIG. 2 at a first time and later at a second time. For example, the controller 109 can perform the steps shown in FIG. 2 repeatedly as the robot 101 moves within a space. In some implementations, the controller 109 performs other steps if the controller 109, using the image 107 or other data provided by the robot 101, determines the robot 101 is not in a hallway or other confined space.

In some implementations, the process 200 can include additional steps, fewer steps, or some of the steps can be divided into multiple steps. For example, two or more of the steps 202, 204, 206, 208, or 210 can be performed simultaneously, e.g., with one or more processors. In some implementations, techniques described are used for navigation in an alleyway or other space. In some implementations, techniques described are used in building or mapping applications (e.g., determining a home or building layout that minimizes or otherwise accounts for robot navigation in hallways or other spaces where traditional navigation may be unsuitable or prone to inaccuracies or where risk from navigation intolerances are more likely to cause damage to property or person). In some implementations, techniques described help facilitate realtor operations (e.g., inspections for robot compliance).

Figure 3:
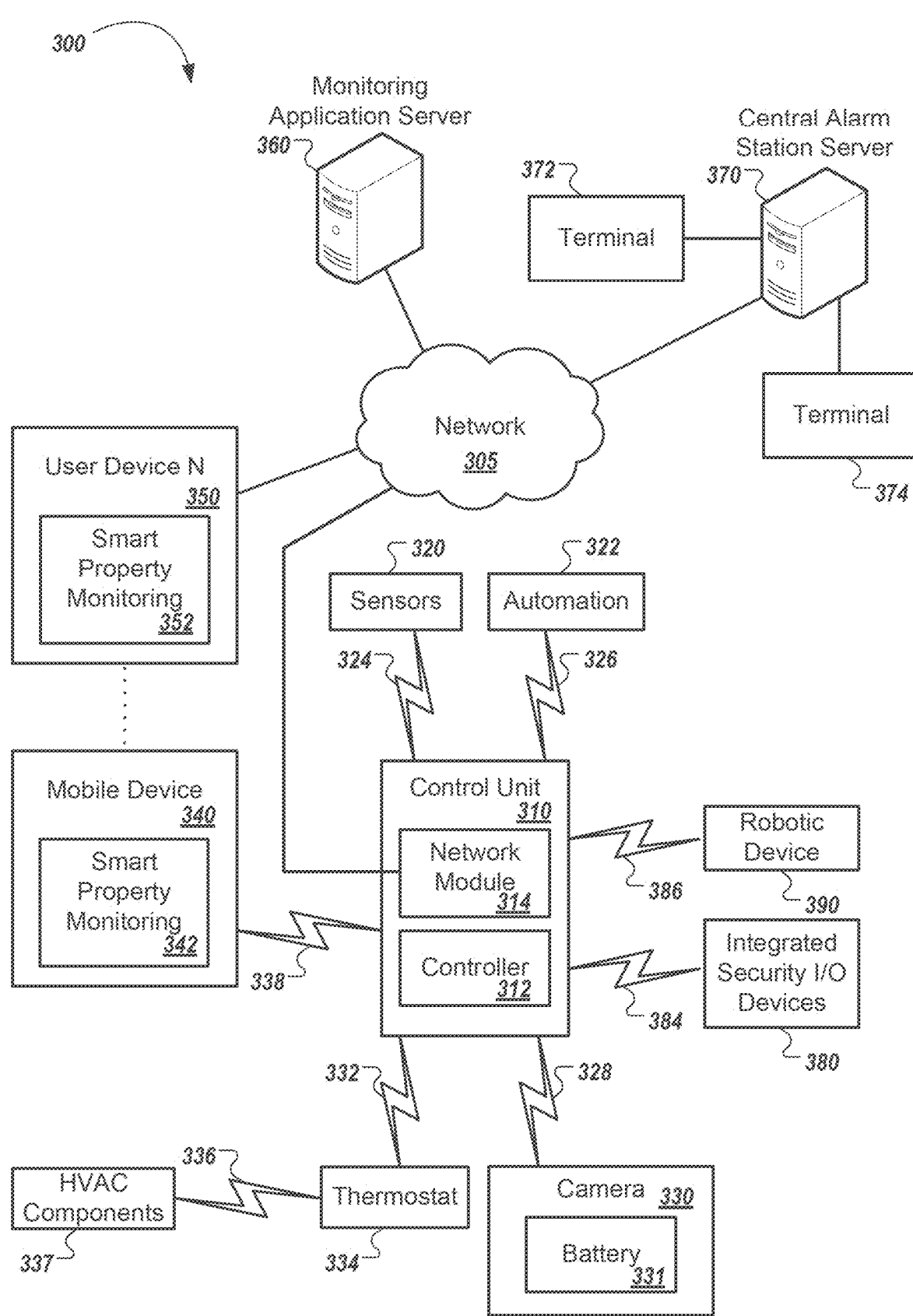
FIG. 3 is a diagram illustrating an example of a property monitoring system.

FIG. 3 is a diagram illustrating an example of a property monitoring system 300. In some cases, the property monitoring system 300 may include components of the system 100 of FIG. 1. For example, the robot 101 may be one of the robotic devices 390 or the controller 109 can be an instance of controller 310.

The property monitoring system 300 includes a network 305, a controller 310, one or more user devices 340 and 350, a monitoring application server 360, and a central alarm station server 370. In some examples, the network 305 facilitates communications between the controller 310, the one or more user devices 340 and 350, the monitoring application server 360, and the central alarm station server 370.

The network 305 is configured to enable exchange of electronic communications between devices connected to the network 305. For example, the network 305 may be configured to enable exchange of electronic communications between the controller 310, the one or more user devices 340 and 350, the monitoring application server 360, and the central alarm station server 370. The network 305 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 305 may include multiple networks or subnetworks, each of which may include, for example, a wired or wireless data pathway. The network 305 may include a circuit-switched network, a packet-switched data network, or any other network able to carry electronic communications (e.g., data or voice communications). For example, the network 305 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 305 may include one or more networks that include wireless data channels and wireless voice channels. The network 305 may be a wireless network, a broadband network, or a combination of networks including a wireless network and a broadband network.

The controller 310 includes a controller 312 and a network module 314. The controller 312 is configured to control a controller monitoring system (e.g., a controller system) that includes the controller 310. In some examples, the controller 312 may include a processor or other control circuitry configured to execute instructions of a program that controls operation of a controller system. In these examples, the controller 312 may be configured to receive input from sensors, flow meters, or other devices included in the controller system and control operations of devices included in the household (e.g., speakers, lights, doors, etc.). For example, the controller 312 may be configured to control operation of the network module 314 included in the controller 310.

The network module 314 is a communication device configured to exchange communications over the network 305. The network module 314 may be a wireless communication module configured to exchange wireless communications over the network 305. For example, the network module 314 may be a wireless communication device configured to exchange communications over a wireless data channel and a wireless voice channel. In this example, the network module 314 may transmit alarm data over a wireless data channel and establish a two-way voice communication session over a wireless voice channel. The wireless communication device may include one or more of a LTE module, a GSM module, a radio modem, a cellular transmission module, or any type of module configured to exchange communications in one of the following formats: LTE, GSM or GPRS, CDMA, EDGE or EGPRS, EV-DO or EVDO, UMTS, or IP.

The network module 314 also may be a wired communication module configured to exchange communications over the network 305 using a wired connection. For instance, the network module 314 may be a modem, a network interface card, or another type of network interface device. The network module 314 may be an Ethernet network card configured to enable the controller 310 to communicate over a local area network and/or the Internet. The network module 314 also may be a voice band modem configured to enable the alarm panel to communicate over the telephone lines of Plain Old Telephone Systems (POTS).

The controller system that includes the controller 310 includes one or more sensors. For example, the monitoring system 300 may include multiple sensors 320. The sensors 320 may include a lock sensor, a contact sensor, a motion sensor, or any other type of sensor included in a controller system. The sensors 320 also may include an environmental sensor, such as a temperature sensor, a water sensor, a rain sensor, a wind sensor, a light sensor, a smoke detector, a carbon monoxide detector, an air quality sensor, etc. The sensors 320 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the health monitoring sensor can be a wearable sensor that attaches to a user in the property. The health monitoring sensor can collect various health data, including pulse, heart-rate, respiration rate, sugar or glucose level, bodily temperature, or motion data. The sensors 320 can include a radio-frequency identification (RFID) sensor that identifies a particular article that includes a pre-assigned RFID tag.

The controller 310 communicates with the module 322 and a camera 330 to perform monitoring. The module 322 is connected to one or more devices that enable property automation, e.g., home or business automation. For instance, the module 322 may be connected to one or more lighting systems and may be configured to control operation of the one or more lighting systems. Also, the module 322 may be connected to one or more electronic locks at the property and may be configured to control operation of the one or more electronic locks (e.g., control Z-Wave locks using wireless communications in the Z-Wave protocol). Further, the module 322 may be connected to one or more appliances at the property and may be configured to control operation of the one or more appliances. The module 322 may include multiple modules that are each specific to the type of device being controlled in an automated manner. The module 322 may control the one or more devices based on commands received from the controller 310. For instance, the module 322 may cause a lighting system to illuminate an area to provide a better image of the area when captured by a camera 330. The camera 330 can include one or more batteries 331 that require charging.

A drone 390 can be used to survey the electronic system 300. In particular, the drone 390 can capture images of each item found in the electronic system 300 and provide images to the controller 310 for further processing. Alternatively, the drone 390 can process the images to determine an identification of the items found in the electronic system 300.

The camera 330 may be a video/photographic camera or other type of optical sensing device configured to capture images. For instance, the camera 330 may be configured to capture images of an area within a property monitored by the controller 310. The camera 330 may be configured to capture single, static images of the area or video images of the area in which multiple images of the area are captured at a relatively high frequency (e.g., thirty images per second) or both. The camera 330 may be controlled based on commands received from the controller 310.

The camera 330 may be triggered by several different types of techniques. For instance, a Passive Infra-Red (PIR) motion sensor may be built into the camera 330 and used to trigger the camera 330 to capture one or more images when motion is detected. The camera 330 also may include a microwave motion sensor built into the camera and used to trigger the camera 330 to capture one or more images when motion is detected. The camera 330 may have a "normally open" or "normally closed" digital input that can trigger capture of one or more images when external sensors (e.g., the sensors 320, PIR, door/window, etc.) detect motion or other events. In some implementations, the camera 330 receives a command to capture an image when external devices detect motion or another potential alarm event. The camera 330 may receive the command from the controller 312 or directly from one of the sensors 320.

In some examples, the camera 330 triggers integrated or external illuminators (e.g., Infra-Red, Z-wave controlled "white" lights, lights controlled by the module 322, etc.) to improve image quality when the scene is dark. An integrated or separate light sensor may be used to determine if illumination is desired and may result in increased image quality.

The camera 330 may be programmed with any combination of time/day schedules, system "arming state", or other variables to determine whether images should be captured or not when triggers occur. The camera 330 may enter a low-power mode when not capturing images. In this case, the camera 330 may wake periodically to check for inbound messages from the controller 312. The camera 330 may be powered by internal, replaceable batteries, e.g., if located remotely from the controller 310. The camera 330 may employ a small solar cell to recharge the battery when light is available. The camera 330 may be powered by the controller's 312 power supply if the camera 330 is co-located with the controller 312.

In some implementations, the camera 330 communicates directly with the monitoring application server 360 over the Internet. In these implementations, image data captured by the camera 330 does not pass through the controller 310 and the camera 330 receives commands related to operation from the monitoring application server 360.

The system 300 also includes thermostat 334 to perform dynamic environmental control at the property. The thermostat 334 is configured to monitor temperature and/or energy consumption of an HVAC system associated with the thermostat 334, and is further configured to provide control of environmental (e.g., temperature) settings. In some implementations, the thermostat 334 can additionally or alternatively receive data relating to activity at a property and/or environmental data at a property, e.g., at various locations indoors and outdoors at the property. The thermostat 334 can directly measure energy consumption of the HVAC system associated with the thermostat, or can estimate energy consumption of the HVAC system associated with the thermostat 334, for example, based on detected usage of one or more components of the HVAC system associated with the thermostat 334. The thermostat 334 can communicate temperature and/or energy monitoring information to or from the controller 310 and can control the environmental (e.g., temperature) settings based on commands received from the controller 310.

In some implementations, the thermostat 334 is a dynamically programmable thermostat and can be integrated with the controller 310. For example, the dynamically programmable thermostat 334 can include the controller 310, e.g., as an internal component to the dynamically programmable thermostat 334. In addition, the controller 310 can be a gateway device that communicates with the dynamically programmable thermostat 334. In some implementations, the thermostat 334 is controlled via one or more module 322.

A module 337 is connected to one or more components of an HVAC system associated with a property, and is configured to control operation of the one or more components of the HVAC system. In some implementations, the module 337 is also configured to monitor energy consumption of the HVAC system components, for example, by directly measuring the energy consumption of the HVAC system components or by estimating the energy usage of the one or more HVAC system components based on detecting usage of components of the HVAC system. The module 337 can communicate energy monitoring information and the state of the HVAC system components to the thermostat 334 and can control the one or more components of the HVAC system based on commands received from the thermostat 334.

In some examples, the system 300 further includes one or more robotic devices 390. The robotic devices 390 may be any type of robots that are capable of moving and taking actions that assist in security monitoring. For example, the robotic devices 390 may include drones that are capable of moving throughout a property based on automated control technology and/or user input control provided by a user. In this example, the drones may be able to fly, roll, walk, or otherwise move about the property. The drones may include helicopter type devices (e.g., quad copters), rolling helicopter type devices (e.g., roller copter devices that can fly and also roll along the ground, walls, or ceiling) and land vehicle type devices (e.g., automated cars that drive around a property). In some cases, the robotic devices 390 may be robotic devices 390 that are intended for other purposes and merely associated with the system 300 for use in appropriate circumstances. For instance, a robotic vacuum cleaner device may be associated with the monitoring system 300 as one of the robotic devices 390 and may be controlled to take action responsive to monitoring system events.

In some examples, the robotic devices 390 automatically navigate within a property. In these examples, the robotic devices 390 include sensors and control processors that guide movement of the robotic devices 390 within the property. For instance, the robotic devices 390 may navigate within the property using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The robotic devices 390 may include control processors that process output from the various sensors and control the robotic devices 390 to move along a path that reaches the desired destination and avoids obstacles. In this regard, the control processors detect walls or other obstacles in the property and guide movement of the robotic devices 390 in a manner that avoids the walls and other obstacles.

In addition, the robotic devices 390 may store data that describes attributes of the property. For instance, the robotic devices 390 may store a floorplan and/or a three-dimensional model of the property that enables the robotic devices 390 to navigate the property. During initial configuration, the robotic devices 390 may receive the data describing attributes of the property, determine a frame of reference to the data (e.g., a property or reference location in the property), and navigate the property based on the frame of reference and the data describing attributes of the property. Further, initial configuration of the robotic devices 390 also may include learning of one or more navigation patterns in which a user provides input to control the robotic devices 390 to perform a specific navigation action (e.g., fly to an upstairs bedroom and spin around while capturing video and then return to a property charging base). In this regard, the robotic devices 390 may learn and store the navigation patterns such that the robotic devices 390 may automatically repeat the specific navigation actions upon a later request.

In some examples, the robotic devices 390 may include data capture and recording devices. In these examples, the robotic devices 390 may include one or more cameras, one or more motion sensors, one or more microphones, one or more biometric data collection tools, one or more temperature sensors, one or more humidity sensors, one or more air flow sensors, and/or any other types of sensor that may be useful in capturing monitoring data related to the property and users in the property. The one or more biometric data collection tools may be configured to collect biometric samples of a person in the property with or without contact of the person. For instance, the biometric data collection tools may include a fingerprint scanner, a hair sample collection tool, a skin cell collection tool, and/or any other tool that allows the robotic devices 390 to take and store a biometric sample that can be used to identify the person (e.g., a biometric sample with DNA that can be used for DNA testing).

In some implementations, the robotic devices 390 may include output devices. In these implementations, the robotic devices 390 may include one or more displays, one or more speakers, and/or any type of output devices that allow the robotic devices 390 to communicate information to a nearby user.

The robotic devices 390 also may include a communication module that enables the robotic devices 390 to communicate with the controller 310, each other, and/or other devices. The communication module may be a wireless communication module that allows the robotic devices 390 to communicate wirelessly. For instance, the communication module may be a Wi-Fi module that enables the robotic devices 390 to communicate over a local wireless network at the property. The communication module further may be a 900 MHz wireless communication module that enables the robotic devices 390 to communicate directly with the controller 310. Other types of short-range wireless communication protocols, such as Bluetooth, Bluetooth LE, Z-wave, Zigbee, etc., may be used to allow the robotic devices 390 to communicate with other devices in the property. In some implementations, the robotic devices 390 may communicate with each other or with other devices of the system 300 through the network 305.

The robotic devices 390 further may include processor and storage capabilities. The robotic devices 390 may include any suitable processing devices that enable the robotic devices 390 to operate applications and perform the actions described throughout this disclosure. In addition, the robotic devices 390 may include solid-state electronic storage that enables the robotic devices 390 to store applications, configuration data, collected sensor data, and/or any other type of information available to the robotic devices 390.

The robotic devices 390 are associated with one or more charging stations. The charging stations may be located at predefined home base or reference locations in the property. The robotic devices 390 may be configured to navigate to the charging stations after completion of tasks needed to be performed for the property monitoring system 300. For instance, after completion of a monitoring operation or upon instruction by the controller 310, the robotic devices 390 may be configured to automatically fly to and land on one of the charging stations. In this regard, the robotic devices 390 may automatically maintain a fully charged battery in a state in which the robotic devices 390 are ready for use by the property monitoring system 300.

The charging stations may be contact based charging stations and/or wireless charging stations. For contact based charging stations, the robotic devices 390 may have readily accessible points of contact that the robotic devices 390 are capable of positioning and mating with a corresponding contact on the charging station. For instance, a helicopter type robotic device may have an electronic contact on a portion of its landing gear that rests on and mates with an electronic pad of a charging station when the helicopter type robotic device lands on the charging station. The electronic contact on the robotic device may include a cover that opens to expose the electronic contact when the robotic device is charging and closes to cover and insulate the electronic contact when the robotic device is in operation.

For wireless charging stations, the robotic devices 390 may charge through a wireless exchange of power. In these cases, the robotic devices 390 need only locate themselves closely enough to the wireless charging stations for the wireless exchange of power to occur. In this regard, the positioning needed to land at a predefined home base or reference location in the property may be less precise than with a contact based charging station. Based on the robotic devices 390 landing at a wireless charging station, the wireless charging station outputs a wireless signal that the robotic devices 390 receive and convert to a power signal that charges a battery maintained on the robotic devices 390.

In some implementations, each of the robotic devices 390 has a corresponding and assigned charging station such that the number of robotic devices 390 equals the number of charging stations. In these implementations, the robotic devices 390 always navigate to the specific charging station assigned to that robotic device. For instance, a first robotic device may always use a first charging station and a second robotic device may always use a second charging station.

In some examples, the robotic devices 390 may share charging stations. For instance, the robotic devices 390 may use one or more community charging stations that are capable of charging multiple robotic devices 390. The community charging station may be configured to charge multiple robotic devices 390 in parallel. The community charging station may be configured to charge multiple robotic devices 390 in serial such that the multiple robotic devices 390 take turns charging and, when fully charged, return to a predefined home base or reference location in the property that is not associated with a charger. The number of community charging stations may be less than the number of robotic devices 390.

Also, the charging stations may not be assigned to specific robotic devices 390 and may be capable of charging any of the robotic devices 390. In this regard, the robotic devices 390 may use any suitable, unoccupied charging station when not in use. For instance, when one of the robotic devices 390 has completed an operation or is in need of battery charge, the controller 310 references a stored table of the occupancy status of each charging station and instructs the robotic device to navigate to the nearest charging station that is unoccupied.

The system 300 further includes one or more integrated security devices 380. The one or more integrated security devices may include any type of device used to provide alerts based on received sensor data. For instance, the one or more controllers 310 may provide one or more alerts to the one or more integrated security input/output devices 380. Additionally, the one or more controllers 310 may receive sensor data from the sensors 320 and determine whether to provide an alert to the one or more integrated security input/output devices 380.

The sensors 320, the module 322, the camera 330, the thermostat 334, and the integrated security devices 380 may communicate with the controller 312 over communication links 324, 326, 328, 332, 338, 384, and 386. The communication links 324, 326, 328, 332, 338, 384, and 386 may be a wired or wireless data pathway configured to transmit signals from the sensors 320, the module 322, the camera 330, the thermostat 334, the drone 390, and the integrated security devices 380 to the controller 312. The sensors 320, the module 322, the camera 330, the thermostat 334, the drone 390, and the integrated security devices 380 may continuously transmit sensed values to the controller 312, periodically transmit sensed values to the controller 312, or transmit sensed values to the controller 312 in response to a change in a sensed value. In some implementations, the drone 390 can communicate with the monitoring application server 360 over network 305. The drone 390 can connect and communicate with the monitoring application server 360 using a Wi-Fi or a cellular connection.

The communication links 324, 326, 328, 332, 338, 384, and 386 may include a local network. The sensors 320, the module 322, the camera 330, the thermostat 334, the drone 390 and the integrated security devices 380, and the controller 312 may exchange data and commands over the local network. The local network may include 802.11 "Wi-Fi" wireless Ethernet (e.g., using low-power Wi-Fi chipsets), Z-Wave, Zigbee, Bluetooth, "HomePlug" or other "Power-line" networks that operate over AC wiring, and a Category 5 (CAT5) or Category 6 (CAT6) wired Ethernet network. The local network may be a mesh network constructed based on the devices connected to the mesh network.

The monitoring application server 360 is an electronic device configured to provide monitoring services by exchanging electronic communications with the controller 310, the one or more user devices 340 and 350, and the central alarm station server 370 over the network 305. For example, the monitoring application server 360 may be configured to monitor events (e.g., alarm events) generated by the controller 310. In this example, the monitoring application server 360 may exchange electronic communications with the network module 314 included in the controller 310 to receive information regarding events (e.g., alerts) detected by the controller 310. The monitoring application server 360 also may receive information regarding events (e.g., alerts) from the one or more user devices 340 and 350.

In some examples, the monitoring application server 360 may route alert data received from the network module 314 or the one or more user devices 340 and 350 to the central alarm station server 370. For example, the monitoring application server 360 may transmit the alert data to the central alarm station server 370 over the network 305.

The monitoring application server 360 may store sensor and image data received from the monitoring system 300 and perform analysis of sensor and image data received from the monitoring system 300. Based on the analysis, the monitoring application server 360 may communicate with and control aspects of the controller 310 or the one or more user devices 340 and 350.

The monitoring application server 360 may provide various monitoring services to the system 300. For example, the monitoring application server 360 may analyze the sensor, image, and other data to determine an activity pattern of a resident of the property monitored by the system 300. In some implementations, the monitoring application server 360 may analyze the data for alarm conditions or may determine and perform actions at the property by issuing commands to one or more components of the system 300, possibly through the controller 310.

The central alarm station server 370 is an electronic device configured to provide alarm monitoring service by exchanging communications with the controller 310, the one or more mobile devices 340 and 350, and the monitoring application server 360 over the network 305. For example, the central alarm station server 370 may be configured to monitor alerting events generated by the controller 310. In this example, the central alarm station server 370 may exchange communications with the network module 314 included in the controller 310 to receive information regarding alerting events detected by the controller 310. The central alarm station server 370 also may receive information regarding alerting events from the one or more mobile devices 340 and 350 and/or the monitoring application server 360.

The central alarm station server 370 is connected to multiple terminals 372 and 374. The terminals 372 and 374 may be used by operators to process alerting events. For example, the central alarm station server 370 may route alerting data to the terminals 372 and 374 to enable an operator to process the alerting data. The terminals 372 and 374 may include general-purpose computers (e.g., desktop personal computers, workstations, or laptop computers) that are configured to receive alerting data from a server in the central alarm station server 370 and render a display of information based on the alerting data. For instance, the controller 312 may control the network module 314 to transmit, to the central alarm station server 370, alerting data indicating that a sensor 320 detected motion from a motion sensor via the sensors 320. The central alarm station server 370 may receive the alerting data and route the alerting data to the terminal 372 for processing by an operator associated with the terminal 372. The terminal 372 may render a display to the operator that includes information associated with the alerting event (e.g., the lock sensor data, the motion sensor data, the contact sensor data, etc.) and the operator may handle the alerting event based on the displayed information.

In some implementations, the terminals 372 and 374 may be mobile devices or devices designed for a specific function. Although FIG. 3 illustrates two terminals for brevity, actual implementations may include more (and, perhaps, many more) terminals.

The one or more user devices 340 and 350 are devices that host and display user interfaces. For instance, the user device 340 is a mobile device that hosts or runs one or more native applications (e.g., the smart property application 342). The user device 340 may be a cellular phone or a non-cellular locally networked device with a display. The user device 340 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 340 may perform functions unrelated to the monitoring system, such as placing personal telephone calls, playing music, playing video, displaying pictures, browsing the Internet, maintaining an electronic calendar, etc.

The user device 340 includes a smart property application 342. The smart property application 342 refers to a software/firmware program running on the corresponding mobile device that enables the user interface and features described throughout. The user device 340 may load or install the smart property application 342 based on data received over a network or data received from local media. The smart property application 342 runs on mobile devices platforms, such as iPhone, iPod touch, Blackberry, Google Android, Windows Mobile, etc. The smart property application 342 enables the user device 340 to receive and process image and sensor data from the monitoring system.

The user device 350 may be a general-purpose computer (e.g., a desktop personal computer, a workstation, or a laptop computer) that is configured to communicate with the monitoring application server 360 and/or the controller 310 over the network 305. The user device 350 may be configured to display a smart property user interface 352 that is generated by the user device 350 or generated by the monitoring application server 360. For example, the user device 350 may be configured to display a user interface (e.g., a web page) provided by the monitoring application server 360 that enables a user to perceive images captured by the camera 330 and/or reports related to the monitoring system. Although FIG. 3 illustrates two user devices for brevity, actual implementations may include more (and, perhaps, many more) or fewer user devices.

In some implementations, the one or more user devices 340 and 350 communicate with and receive monitoring system data from the controller 310 using the communication link 338. For instance, the one or more user devices 340 and 350 may communicate with the controller 310 using various local wireless protocols such as Wi-Fi, Bluetooth, Z-wave, Zigbee, HomePlug (Ethernet over power line), or wired protocols such as Ethernet and USB, to connect the one or more user devices 340 and 350 to local security and automation equipment. The one or more user devices 340 and 350 may connect locally to the monitoring system and its sensors and other devices. The local connection may improve the speed of status and control communications because communicating through the network 305 with a remote server (e.g., the monitoring application server 360) may be significantly slower.

Although the one or more user devices 340 and 350 are shown as communicating with the controller 310, the one or more user devices 340 and 350 may communicate directly with the sensors and other devices controlled by the controller 310. In some implementations, the one or more user devices 340 and 350 replace the controller 310 and perform the functions of the controller 310 for local monitoring and long range/offsite communication.

In other implementations, the one or more user devices 340 and 350 receive monitoring system data captured by the controller 310 through the network 305. The one or more user devices 340, 350 may receive the data from the controller 310 through the network 305 or the monitoring application server 360 may relay data received from the controller 310 to the one or more user devices 340 and 350 through the network 305. In this regard, the monitoring application server 360 may facilitate communication between the one or more user devices 340 and 350 and the monitoring system.

In some implementations, the one or more user devices 340 and 350 may be configured to switch whether the one or more user devices 340 and 350 communicate with the controller 310 directly (e.g., through link 338) or through the monitoring application server 360 (e.g., through network 305) based on a location of the one or more user devices 340 and 350. For instance, when the one or more user devices 340 and 350 are located close to the controller 310 and in range to communicate directly with the controller 310, the one or more user devices 340 and 350 use direct communication. When the one or more user devices 340 and 350 are located far from the controller 310 and not in range to communicate directly with the controller 310, the one or more user devices 340 and 350 use communication through the monitoring application server 360.

Although the one or more user devices 340 and 350 are shown as being connected to the network 305, in some implementations, the one or more user devices 340 and 350 are not connected to the network 305. In these implementations, the one or more user devices 340 and 350 communicate directly with one or more of the monitoring system components and no network (e.g., Internet) connection or reliance on remote servers is needed.

In some implementations, the one or more user devices 340 and 350 are used in conjunction with only local sensors and/or local devices in a house. In these implementations, the system 300 includes the one or more user devices 340 and 350, the sensors 320, the module 322, the camera 330, and the robotic devices, e.g., that can include the drone 390. The one or more user devices 340 and 350 receive data directly from the sensors 320, the module 322, the camera 330, and the robotic devices and send data directly to the sensors 320, the module 322, the camera 330, and the robotic devices. The one or more user devices 340, 350 provide the appropriate interfaces/processing to provide visual surveillance and reporting.

In other implementations, the system 300 further includes network 305 and the sensors 320, the module 322, the camera 330, the thermostat 334, and the robotic devices are configured to communicate sensor and image data to the one or more user devices 340 and 350 over network 305 (e.g., the Internet, cellular network, etc.). In yet another implementation, the sensors 320, the module 322, the camera 330, the thermostat 334, and the robotic devices are intelligent enough to change the communication pathway from a direct local pathway when the one or more user devices 340 and 350 are in close physical proximity to the sensors 320, the module 322, the camera 330, the thermostat 334, and the robotic devices to a pathway over network 305 when the one or more user devices 340 and 350 are farther from the sensors 320, the module 322, the camera 330, the thermostat 334, and the robotic devices. In some examples, the system leverages GPS information from the one or more user devices 340 and 350 to determine whether the one or more user devices 340 and 350 are close enough to the sensors 320, the module 322, the camera 330, the thermostat 334, and the robotic devices to use the direct local pathway or whether the one or more user devices 340 and 350 are far enough from the sensors 320, the module 322, the camera 330, the thermostat 334, and the robotic devices that the pathway over network 305 is required. In other examples, the system leverages status communications (e.g., pinging) between the one or more user devices 340 and 350 and the sensors 320, the module 322, the camera 330, the thermostat 334, and the robotic devices to determine whether communication using the direct local pathway is possible. If communication using the direct local pathway is possible, the one or more user devices 340 and 350 communicate with the sensors 320, the module 322, the camera 330, the thermostat 334, and the robotic devices using the direct local pathway. If communication using the direct local pathway is not possible, the one or more user devices 340 and 350 communicate with the sensors 320, the module 322, the camera 330, the thermostat 334, and the robotic devices using the pathway over network 305.

In some implementations, the system 300 provides end users with access to images captured by the camera 330 to aid in decision-making. The system 300 may transmit the images captured by the camera 330 over a wireless WAN network to the user devices 340 and 350. Because transmission over a wireless WAN network may be relatively expensive, the system 300 can use several techniques to reduce costs while providing access to significant levels of useful visual information (e.g., compressing data, down-sampling data, sending data only over inexpensive LAN connections, or other techniques).

In some implementations, a state of the monitoring system 300 and other events sensed by the monitoring system 300 may be used to enable/disable video/image recording devices (e.g., the camera 330). In these implementations, the camera 330 may be set to capture images on a periodic basis when the alarm system is armed in an "away" state, but set not to capture images when the alarm system is armed in a "stay" state or disarmed. In addition, the camera 330 may be triggered to begin capturing images when the alarm system detects an event, such as an alarm event, a door-opening event for a door that leads to an area within a field of view of the camera 330, or motion in the area within the field of view of the camera 330. In other implementations, the camera 330 may capture images continuously, but the captured images may be stored or transmitted over a network when needed.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language.

Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed ASICs (application-specific integrated circuits).

It will be understood that various modifications may be made. For example, other useful implementations could be achieved if operations of the disclosed techniques were performed in a different order and/or if components in the disclosed systems were combined in a different manner and/or replaced or supplemented by other components. Accordingly, other implementations are within the scope of the disclosure.

The invention claimed is:

1. A system comprising one or more computers and one or more storage devices on which are stored instructions that are operable, when executed by the one or more computers, to cause the one or more computers to perform operations comprising:

obtaining, from a robot, sensor data that includes data of a first area with a first distance between a first set of walls that face one another;

determining, using the obtained sensor data, that the robot moved from the first area with the first distance between the first set of walls that face one another to a second area with a second, different distance between a second set of walls that face one another;

in response to determining that the robot moved from the first area with the first distance between the first set of walls that face one another to the second area with the second, different distance between the second set of walls that face one another:

detecting two or more lines within one or more images of the obtained sensor data;

identifying at least two of the two or more lines as vanishing lines;

determining, using the vanishing lines, a correction maneuver; and controlling the robot to implement the correction maneuver.

2. The system of claim 1, wherein controlling the robot to implement the correction maneuver comprises:

providing the correction maneuver to the robot.

3. The system of claim 1, wherein determining, using the vanishing lines, the correction maneuver comprises:

determining, using the vanishing lines, a centeredness of the robot, wherein the centeredness indicates a location of the robot with reference to the second area; and determining, using the centeredness of the robot, the correction maneuver.

4. The system of claim 3, wherein determining, using the vanishing lines, the centeredness of the robot comprises:

determining (i) a first slope of a first vanishing line of the at least two vanishing lines and (ii) a second slope of a second vanishing line of the at least two vanishing lines;

comparing the first slope and the second slope; and determining, using the comparison of the first slope and the second slope, the centeredness of the robot.

5. The system of claim 1, wherein the second area is a hallway.

6. The system of claim 1, wherein determining, using the vanishing lines, the correction maneuver comprises:

determining, using the vanishing lines, a heading of the robot; and determining, using the heading of the robot, the correction maneuver.

7. The system of claim 6, wherein determining, using the vanishing lines, the heading of the robot comprises:

determining an intersection of the at least two vanishing lines; and determining, using the intersection of the at least two vanishing lines, the heading of the robot.

8. The system of claim 7, wherein determining the intersection of the at least two vanishing lines comprises:

extending portions of the at least two vanishing lines that are visible in the one or more images, wherein extended portions include the intersection of the at least two vanishing lines.

9. The system of claim 7, wherein determining, using the intersection of the at least two vanishing lines, the heading of the robot comprises:

comparing a location of the intersection with a location of a middle of an image of the one or more images.

10. The system of claim 9, wherein the operations comprise:

obtaining a width of the image of the one or more images; and determining, using the width of the image, the middle of the image of the one or more images.

11. The system of claim 1, wherein the robot is an aerial drone.

12. The system of claim 1, wherein the operations comprise:

determining, using the obtained sensor data, that the robot is in a space enclosed by walls; and in response to determining that the robot is in the space enclosed by walls, determining that the robot moved from the first area to the second area.

13. The system of claim 1, wherein the obtained sensor data includes data obtained from a proximity sensor, and wherein determining, using the obtained sensor data, that the robot moved from the first area to the second area comprises:

comparing the obtained sensor data to one or more thresholds.

14. The system of claim 1, wherein at least one of the first set of walls or the second set of walls are approximately parallel.

15. The system of claim 1, wherein the operations comprise:

determining, using the obtained sensor data, that the robot moved from the second area with the second distance between the second set of walls that face one another to a third area with a third distance between a third set of walls that face one another, wherein the third distance is a different distance than the second distance; and in response to determining that the robot moved from the second area with the second distance between the second set of walls that face one another to the third area with the third distance between the third set of walls that face one another, causing a switch from a first navigation process that uses the vanishing lines to a second navigation process for navigating within the third area, wherein the first navigation process and the second navigation process are different.

16. The system of claim 15, wherein the second navigation process comprises:

performing visual inertial odometry (VIO).

17. The system of claim 15, wherein the third area is the same as the first area.

18. One or more non-transitory computer storage media encoded with instructions that, when executed by one or more computers, cause the one or more computers to perform operations comprising:

obtaining, from a robot, sensor data that includes data of a first area with a first distance between a first set of walls that face one another;

determining, using the obtained sensor data, that the robot moved from the first area with the first distance between the first set of walls that face one another to a second area with a second, different distance between a second set of walls that face one another;

in response to determining that the robot moved from the first area with the first distance between the first set of walls that face one another to the second area with the second, different distance between the second set of walls that face one another:

detecting two or more lines within one or more images of the obtained sensor data;

identifying at least two of the two or more lines as vanishing lines;

determining, using the vanishing lines, a correction maneuver; and controlling the robot to implement the correction maneuver.

19. The storage media of claim 18, wherein controlling the robot to implement the correction maneuver comprises:

providing the correction maneuver to the robot.

20. A computer-implemented method comprising:

obtaining, from a robot, sensor data that includes data of a first area with a first distance between a first set of walls that face one another;

determining, using the obtained sensor data, that the robot moved from the first area with the first distance between the first set of walls that face one another to a second area with a second, different distance between a second set of walls that face one another;

in response to determining that the robot moved from the first area with the first distance between the first set of walls that face one another to the second area with the second, different distance between the second set of walls that face one another:

detecting two or more lines within one or more images of the obtained sensor data;

identifying at least two of the two or more lines as vanishing lines;

determining, using the vanishing lines, a correction maneuver; and controlling the robot to implement the correction maneuver.

* * * * *